United States Patent
DiSimone

(10) Patent No.: US 6,325,614 B1
(45) Date of Patent: Dec. 4, 2001

(54) MOLD ELEMENT RETAINING AND RELEASING MECHANISM

(76) Inventor: John DiSimone, 97 Wycliffe Ave., Woodbridge, Ontario (CA), L4T 3N4

( * ) Notice: Subject to any disclaimer, the term of this patent is extended or adjusted under 35 U.S.C. 154(b) by 0 days.

(21) Appl. No.: 09/295,366

(22) Filed: Apr. 21, 1999

Related U.S. Application Data

(60) Provisional application No. 60/082,866, filed on Apr. 24, 1998.

(51) Int. Cl.[7] .................................................. B29C 33/20
(52) U.S. Cl. ................................ 425/192 R; 425/436 R; 425/444; 425/810
(58) Field of Search ............................. 425/810, 192 R, 425/436 R, 444

(56) References Cited

U.S. PATENT DOCUMENTS

| | | | |
|---|---|---|---|
| 4,348,165 | * | 9/1982 | Vostrovsky ............................ 425/185 |
| 4,372,738 | * | 2/1983 | Black et al. ........................ 425/451.9 |
| 4,555,228 | * | 11/1985 | Nishiike et al. ...................... 425/185 |
| 4,561,626 | | 12/1985 | Black .................................... 249/118 |
| 4,669,741 | | 6/1987 | Rohm .................................... 279/1 C |
| 4,671,764 | | 6/1987 | Hehl ..................................... 425/595 |
| 4,676,474 | * | 6/1987 | Vallet et al. ........................... 249/68 |
| 4,755,981 | | 7/1988 | Ekhoff .................................. 369/270 |
| 4,771,933 | * | 9/1988 | Rohm .................................... 279/1 C |
| 4,861,254 | | 8/1989 | Takeuchi et al. ..................... 425/190 |
| 5,044,921 | * | 9/1991 | Micelli et al. ...................... 425/451.9 |
| 5,056,082 | * | 10/1991 | Ekhoff .................................. 369/270 |
| 5,078,586 | | 1/1992 | Holzschuh ........................ 425/192 R |
| 5,092,758 | | 3/1992 | Tanaka et al. ........................ 425/422 |
| 5,116,210 | | 5/1992 | Watanabe et al. .................... 425/111 |
| 5,259,742 | * | 11/1993 | Ichikawa et al. ....................... 425/47 |
| 5,297,951 | | 3/1994 | Asai ..................................... 425/556 |
| 5,316,466 | | 5/1994 | Tanaka et al. ........................ 425/422 |
| 5,374,177 | | 12/1994 | Hehl ................................. 425/126.1 |
| 5,387,096 | | 2/1995 | Weiser ................................ 425/190 |
| 5,394,599 | | 3/1995 | Kubota et al. .......................... 29/430 |
| 5,401,158 | | 3/1995 | Kubota et al. ........................ 425/186 |
| 5,456,588 | | 10/1995 | Yonekubo et al. ................... 425/183 |
| 5,466,145 | | 11/1995 | Takahashi ............................ 425/190 |
| 5,470,221 | * | 11/1995 | Gaiser ................................. 425/556 |
| 5,486,101 | | 1/1996 | Guyon ............................. 425/192 R |
| 5,599,564 | | 2/1997 | Ishihara et al. ...................... 425/190 |
| 5,607,705 | | 3/1997 | Asai ..................................... 425/190 |
| 5,620,718 | * | 4/1997 | Bohm .................................. 425/190 |
| 5,833,902 | * | 11/1998 | Coxhead et al. ..................... 264/106 |

FOREIGN PATENT DOCUMENTS

| | | |
|---|---|---|
| 663 929 | 1/1988 | (SE) . |
| WO 94/19166 | 9/1994 | (WO) . |

* cited by examiner

*Primary Examiner*—Harold Pyon
*Assistant Examiner*—Joseph S Del Sole

(57) ABSTRACT

A mold element retaining and releasing mechanism includes a spigot to be connected to a mold or to a machine platen and retained in place by a retaining mechanism operable to engage and release the spigot. The retaining mechanism is moved between a first configuration, wherein it engages the spigot and a second configuration wherein it releases the spigot by an actuator which, in a preferred embodiment, is a pneumatically operable piston.

19 Claims, 10 Drawing Sheets

MOLD ELEMENT RETAINING AND RELEASING MECHANISM

This application is a continuation of U.S. provisional application No. 60/082,866 filed on Apr. 24, 1998.

FIELD OF THE INVENTION

The present invention relates to a method and system for retaining a replaceable mold element in place on a molding machine. More specifically, the present invention relates to a retaining and releasing mechanism and actuation system located in a mold half which can engage spigots of various sizes and designs that are attached to a mold element. Preferred embodiments are disclosed in detail wherein a CD or DVD stamper plate or a CD or DVD mold half are retained in an accurate and secure operative position on a molding machine. This method and system allows exchange of a mold element for another in a novel and effective manner.

BACKGROUND OF THE INVENTION

In the manufacture of a wide variety of molded articles it is desired to change one or more elements of a mold from time to time for production changes and/or maintenance purposes. Conventionally, mold elements such as mold inserts, the mold cavity and/or the mold core plates have been retained in place on the mold machine via manually activated retaining and releasing means such as bolts, etc. While such means provide good mechanical strength and can be inexpensive to employ, mold elements retained by them are generally not easily or quickly removed from the mold machine.

The use of conventional fasteners is especially problematic in the molding of articles which require frequent and/or prompt removal and replacement of one or mold elements. For example, in molding automotive bumpers, an element in a mold may need to be changed during a production run to allow different configurations of the bumper to be molded as necessary. A standard bumper may be molded for the majority of cars but an optional lighting package may require that the bumpers molded for some cars include receptacles for fog lamps, or the like. With conventional means of retaining the mold elements, changing the mold elements to allow production of the bumper for optional lighting packages can be onerous and/or time consuming.

The mold element that has to be changed rapidly can be the entire mold, or just one mold half. Reference is made in this regard to the U.S. Pat. No. 5,486,101 to Guyon that shows a mold clamping mechanism including a transverse cylinder and a wedge that interacts with a peg attached to the mold half to be retained. The mold half is thus removable connected to an injection molding machine platen. Unfortunately, the design of Guyon requires a lot of space due to the fact that the cylinder is in a transverse position in order to move the wedge laterally with respect to the peg. Also, if many changes of the mold half are required, the working surfaces of the wedge and of the peg can be worn out due to the high friction they are exposed to in use. This can cause the peg to become loosely connected to the machine platen after a certain time. Therefore the design concept of Guyon is not applicable to applications which require many changes and which require accurate positioning, such as the retention of the stamper plate in a CD mold. The stamper plate has to be replaced very fast, accurately and typically tens of times during a 24 hours manufacturing cycle.

Information carrier articles such as CDs (compact discs) or DVDs (digital versatile discs) are typically molded in a three part mold, comprising a stationary mold plate, a movable mold plate and a stamper plate. The stamper plate is a removable mold element which is maintained in the mold cavity formed between the stationary and the movable mold plates. The stamper is a plate-like disc element with upstanding bosses responsible for forming the encoded digital information carrier pits in the molded final article. Each time a different information title is to be molded, the stamper is changed appropriately.

The technical and patent literature disclose several ways to retain the stamper plate in a CD mold. The first way is to hold directly the stamper plate using vacuum or magnetic clamping means as shown for example in the U.S. Pat. No. 5,552,098 to Kudo and more recently in the U.S. Pat. No. 5,612,062 to Takahashi. The second way is to use a central holder attached to the stamper plate that is retained using either mechanical means or vacuum means. U.S. Pat. No. 5,116,210 of Watanabe et al. shows the mechanical approach and U.S. Pat. No. 5,297,951 of Asai shows the vacuum approach. A third way is to use a combination of the direct and the central holding means. The direct means can be a ring pressing the outer diameter of the stamper plate which is employed with a central holding means. This combined approach is disclosed amongst other in the U.S. Pat. No. 4,917,833 of Cools and U.S. Pat. No. 5,297,951 of Asai.

While under ideal circumstances the run size of each information title is sufficiently large to mitigate the frequency with which the stamper must be changed (to, for example, once a day), often this is not the case and it is desired to change a stamper several times a day. In most instances the stamper plate is changed using manual means to release the central holder, as shown in the U.S. Pat. No. 5,116,210 of Watanabe, U.S. Pat. No. 5,466,145 of Takahashi and more recently in the U.S. Pat. No. 5,607,705 of Asai. In other instances, automatic means are used to release the stamper plate from the outer ring as shown in U.S. Pat. No. 4,917,833 of Cools.

In addition to the inconvenience of frequent stamper changes, such systems are very slow and thus suffer from the problem that the resin used to mold the information carriers undergoes an undesired crystallisation when it remains in the hot runner of the molding machine for more than a short period of time. Thus, as the change of the stamper in systems such as that shown in the above-mentioned Watanabe, Takahashi, and Asai references can take a significant time to accomplish, the crystallised resin must be purged from the mold machine after each stamper change. This results in a significant amount of waste material and additional manufacturing down time. In addition, a dedicated person is required to select the new stamper plate and to handle the removal and storage of the previous stamper plate and the loading of the new stamper plate.

Previous attempts have been made to address this problem. In this regard, reference is made to Swiss Patent CH 663 929 to Muller et al., the U.S. Pat. No. 5,374,177 to Hehl, PCT publication WO/94/19166 to De Graaf and the Japanese Patent 62-286717 to Shuji et al. While both Muller and De Graaf show known spigot means, robotics systems and stamper storage magazines used during the stamper change process, all of these patents fail to teach enabling designs of the mold itself and, more importantly, fail to teach the actual means used to retain the stamper plate.

Attempts have been made in the past to provide systems for changing a mold element such as a stamper plate in an efficient manner by improving the retaining and releasing means of the stamper plate. For example, U.S. Pat. No. 4,789,320 to Sasamura et al. assigned to the assignee of the present invention and U.S. Pat. No. 4,917,833 to Cools teach an all mechanical stamper plate retention means employing a central spigot attached to the stamper plate and an outer ring independent to the stamper plate that is used to hold the periphery of the stamper disc. In both embodiments, the outer ring has to be firstly disengaged prior to releasing the stamper plate and the spigot from the mold in order to change it.

More specifically, Cools shows a spring based stamper releasing mechanism comprising in the mold half a movable thrust plate connected to a ball bushing. This ball bushing further comprises several circumferential bores wherein balls are located to engage changer sleeve through the annular groove adapted to catch the balls. An outer bushing also has groove adapted to release the balls when they come in alignment. To retain the stamper plate and its support, thrust pins attached to the thrust plate are pushed backward by a guard ring. The guard ring remains attached to the mold plate in the molding position. To replace the stamper plate, the guard ring is rotated by two pneumatic motors and is disconnected from the mold plate and attached to the mold plate. In this way stamper plate can be replaced due to the ejection force upon the sleeve. This design is not suitable for most CD applications as it requires a mechanical guard ring to hold the exterior of the stamper and to further activate the spring based retaining/releasing elements.

Other versions of a retaining mechanism of a stamper plate central holder using threaded stamper holders actuated by gears are shown in Watanabe, Takahashi and Asai. U.S. Pat. No. 5,466,145 to Takahashi shows three related methods of maintaining a stamper in a mold. FIG. 3 of this reference shows a prior art stamper retaining mechanism wherein the stamper is mounted to a centre bush which includes a threaded portion distal the stamper. These threads are engaged by a face gear which is rotated within the mold plate by a geared drive to draw the bush into a bore in the mold plate and toward the face gear, urging the stamper into contact with the mold plate. FIG. 4 of this reference shows a similar prior art system wherein the centre bush includes a locking ring distal the stamper, instead of the threaded portion. In this embodiment, a pair of horizontal control rods extend through the mold plate and into each side of the bore into which the bush is received. The portions of the control in the bore include cam surfaces which engage the locking ring of the bush to urge the stamper into engagement with the mold plate when the control rods are rotated. FIGS. 1 and 2 of this reference show a system wherein the centre bush includes a threaded portion, similar to the embodiment shown in FIG. 3, which is engaged by a pair of control rods, similar to those of FIG. 4, but which include toothed portions to engage the threaded portion, rather than cam surfaces.

However, the mechanisms shown in the Takahashi reference also suffer from disadvantages. Specifically, as stated by Takahashi, the face-gear mechanism of the embodiment of FIG. 3 occupies a significant volume within the mold plate, thus interfering with the routing and sizing of mold cooling systems within the mold plate. Also, the embodiment of FIG. 4 suffers from the disadvantage that the extent to which the stamper may be lifted above the mold plate is limited by the diameter of the control rods and their cam surfaces. Also, the embodiment of FIGS. 1 and 2 is somewhat delicate, requiring proper engagement of the threaded portion of the centre bush with the toothed control rods.

Finally, each of these embodiments is intended to be operated by a human operator who is responsible for changing the stamper and do not lend themselves well to use with automated and/or robotic systems for changing the stampers.

U.S. Pat. No. 5,401,158 to Kubota et al. shows a different concept to exchange a first stamper unit with another. Essentially, each stamper is mounted to a stamper carrier, which is in fact the movable mold half, in a conventional manner to form a stamper assembly. The apparatus removes one stamper assembly and replaces it with another to effect a change of the stamper. However, as this apparatus requires that each stamper be mounted to its own stamper carrier mold, this results in the stamper assemblies having much more mass than the stamper alone. To bring this increased mass up to mold operating temperature requires a significant time in which the mold can not be operated, necessitating that the apparatus preheat the stamper assembly before exchanging it for a stamper assembly already within the mold. Further, the requirement for a stamper carrier for each stamper increases the overall costs to mold the articles.

SUMMARY OF THE INVENTION

A mold element retaining system for securing a mold element to a mold plate, said mold element retaining system comprising:

a retaining spigot connectable to a mold element to be retained;

an axially moveable retaining means having a first configuration to engage said retaining spigot and a second configuration to release said retaining spigot;

an actuator to move said retaining means between said first and second configurations; and, tensioning means for applying axial force to said retaining means in said first configuration urging said mold element toward said mold plate.

The present invention provides a system and method of releasably retaining a mold element, such as a stamper plate, within a mold or an injection molding machine platen. The system is located inside a single mold half with little or no space penalty and employs slidable retaining and actuation mechanisms. The present invention can be applied regardless of whether other retaining means of the stamper plate, such as retaining rings, magnets or vacuum pipes are employed in the mold. Advantageously, the present invention allows changing of a stamper plate or the like very rapidly and without any operator assistance or intervention if it is used in correlation with a suitable robotics arm or other mechanical automated handling means.

The present invention is also believed to be particularly useful for CD and DVD injection molding machines which are employed molding very short-run titles and which thus require tens of changes of stamper plates per day.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
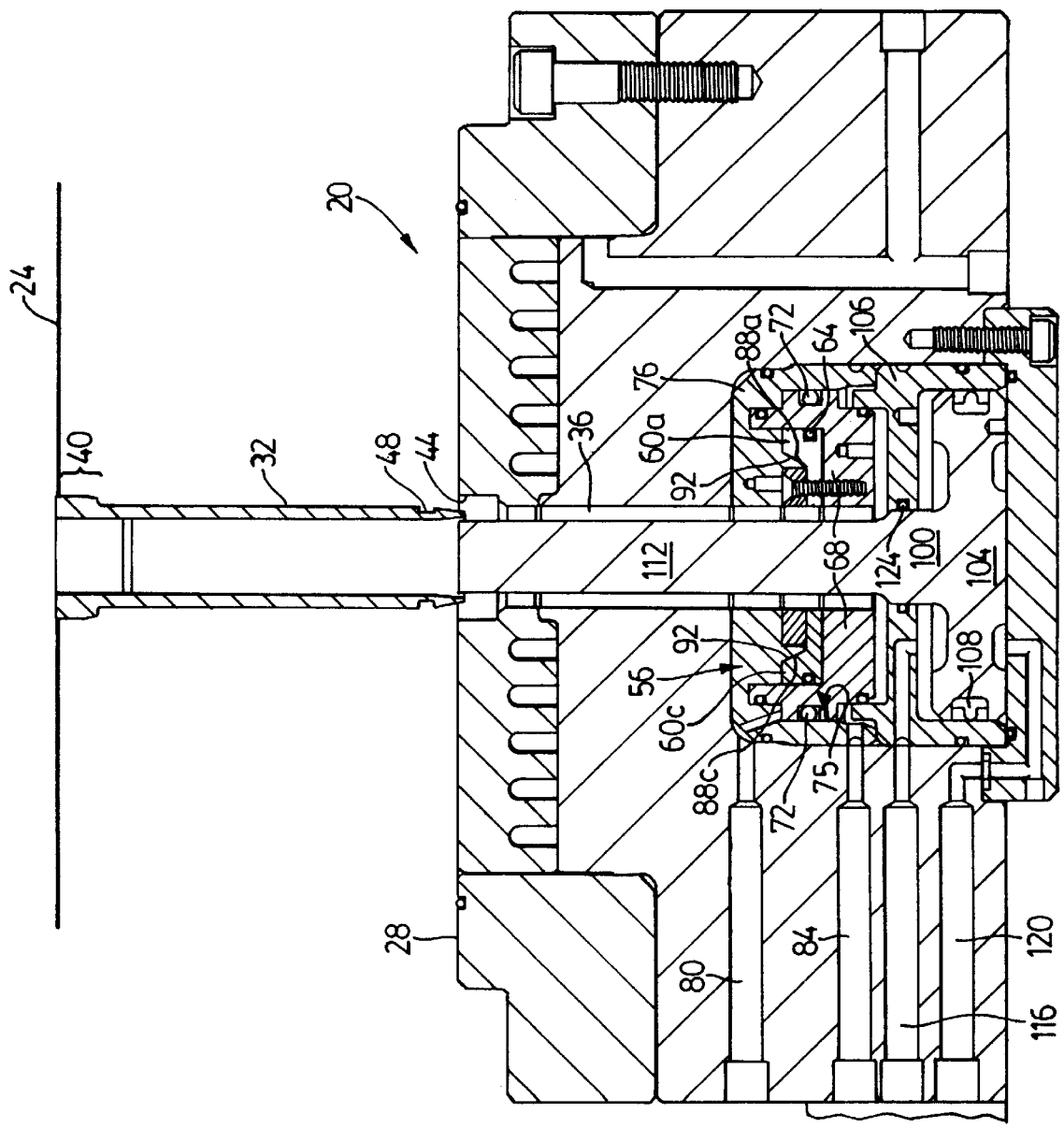
FIG. 1 shows a cross section view of a mold element retaining apparatus in accordance with an embodiment of the present invention.
Figure 2:
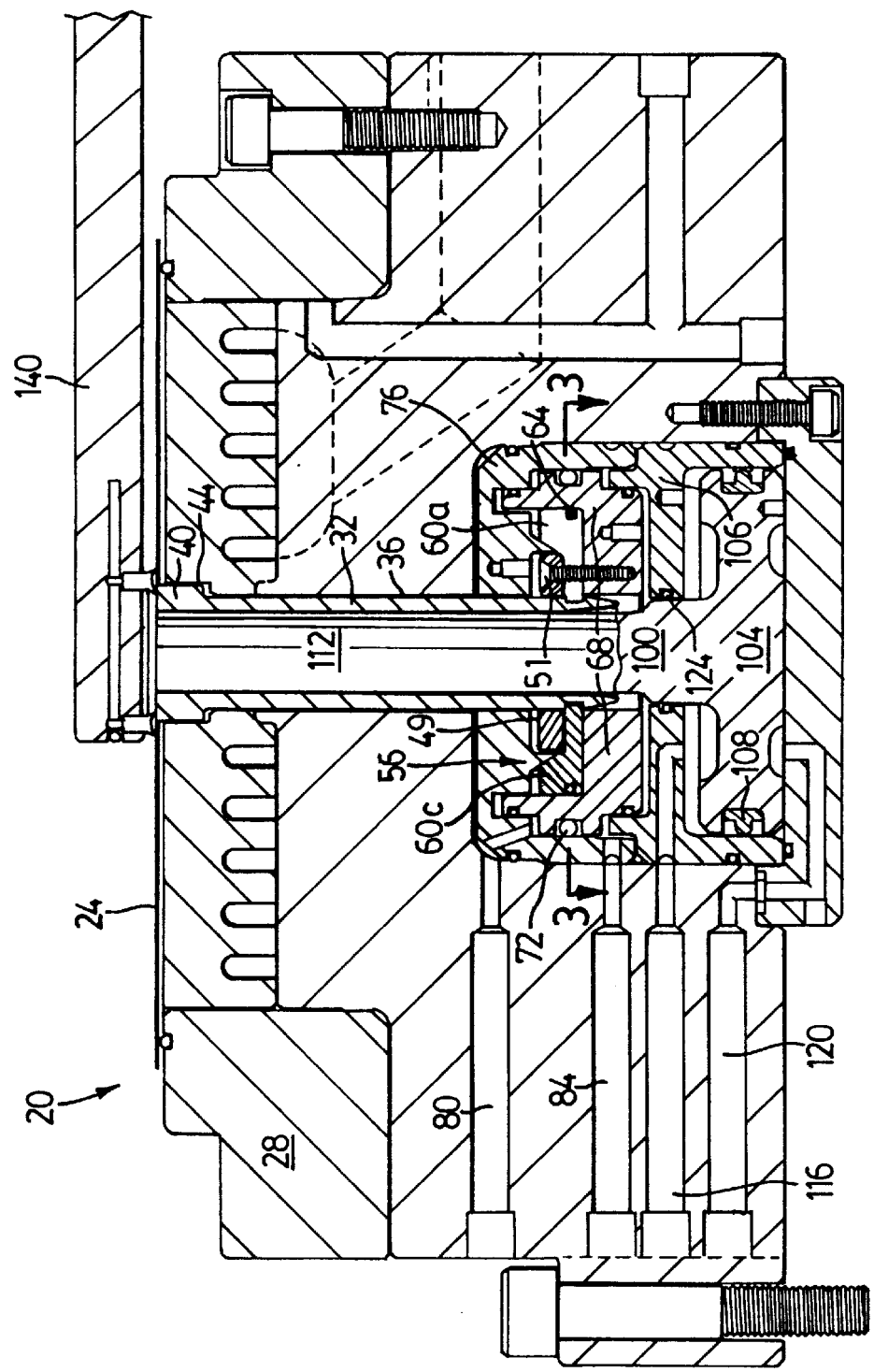
FIG. 2 shows a cross section view of the mold element retaining apparatus of FIG. 1 retaining a mold element.

A mold element retaining and releasing apparatus in accordance with a first embodiment of the present invention is indicated generally at 20 in FIGS. 1 and 2. Apparatus 20 can be employed with an injection mold used to manufacture information carriers such as CDs and DVDs and operable in conjunction with an injection molding machine, such as described in the copending U.S. Pat. No. 5,833,902 assigned to the assignee of the present invention. Retaining apparatus 20 is operable to receive, engage, maintain and release a mold element, such as a known stamper plate 24, in position relative to another mold element, such as movable mold half plate 28.

As best shown in FIG. 1, a known locating and retaining means, such as spigot 32, is attached to stamper plate 24 and is received in a bore 36 in mold half plate 28. In the illustrated embodiment, spigot 32 is circular in cross-section and bore 36 is of a complementary, generally cylindrical, shape and has a diameter that is closely toleranced to the diameter of spigot 32 to substantially eliminate free play between spigot 32 and bore 36 to ensure that stamper 24 is tightly maintained in position relative to mold plate 28 during the injection process and during the ejection of a molded disc. As illustrated, the portion 40 of spigot 32 that is adjacent stamper 24 can be tapered at the bottom portion, from a larger diameter adjacent stamper 24 to a reduced diameter distal stamper 24 and bore 36 can include a complementary tapered portion 44 to receive portion 40 and to thereby further register the position of stamper 24 relative to mold plate 28.

While spigot 32 and bore 36 are shown as being circular in cross section in this Figure, it will be apparent to those of skill in the art that the present invention is not so limited and spigot 32 and bore 36 can include an index means, such as an upraised key on spigot 32 and a complementary groove on bore 36, to provide for angular registration of stamper 24 with respect to mold half plate 28. Similarly, spigot 32 and bore 36 can be square, rectangular or other suitable cross-sectional shapes as desired.

As best seen in FIG. 1, spigot 32 includes a retaining portion, such as for example groove 48, distal stamper 24.

When spigot 32 is inserted into bore 36, as shown in FIG. 2, and stamper 24 is in position against mold plate 28, groove 48 is adjacent to a retainer means which can engage groove 48 to retain stamper 24 in place. Specifically, the retainer means in this embodiment of the present invention comprises a chuck 56, best seen in FIG. 3, which uses slidable jaw means 60 to engage groove 48 to prevent spigot 32, and therefore stamper 24, from being moved relative to mold plate 28 and thus secure the stamper into the mold cavity during all the steps of the injection process.

Figure 3:
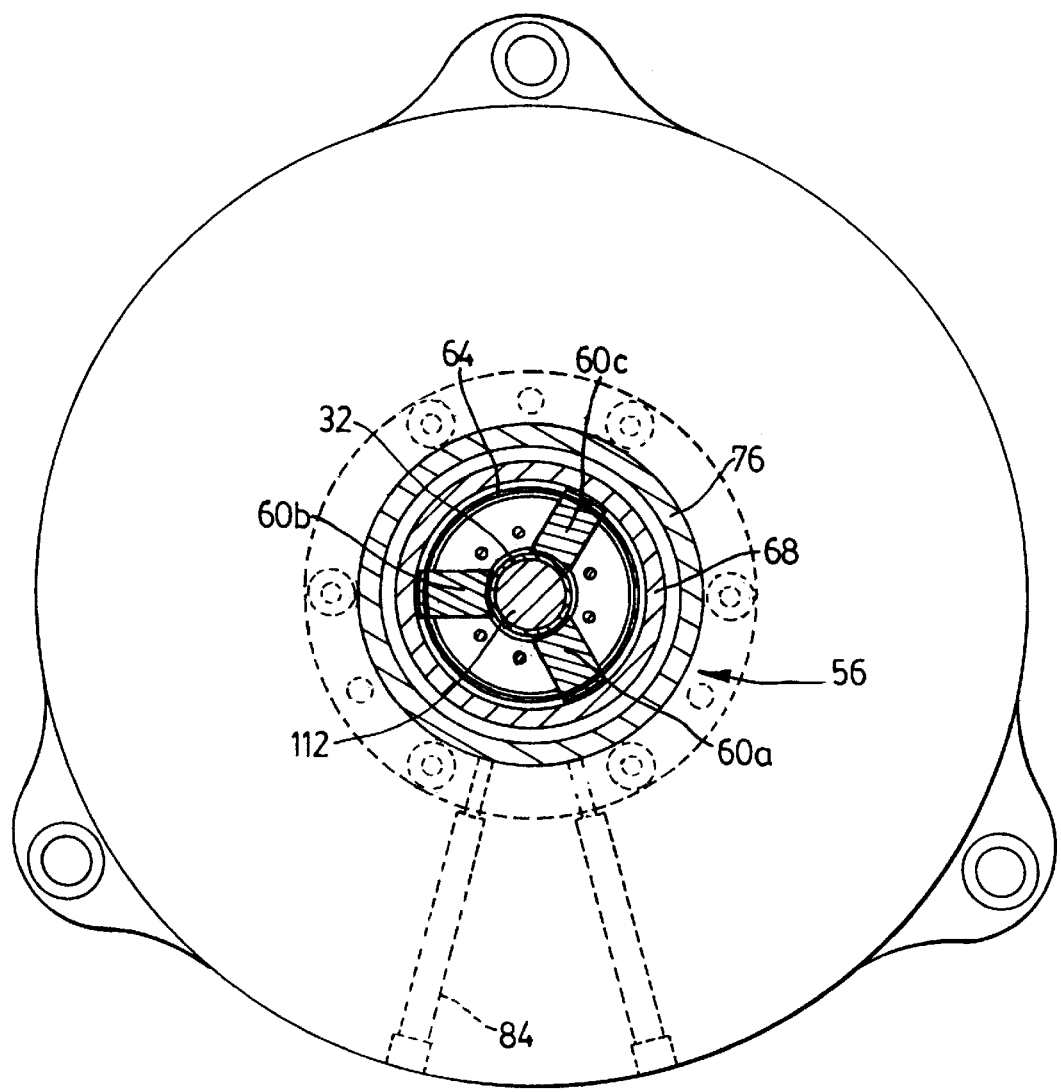
FIG. 3 is a section taken along line 3—3 of FIG. 2.

As shown in FIG. 3, in a presently preferred embodiment, chuck 56 includes three radially slidable jaws 60a, 60b and 60c which are located at equi-spaced positions about the diameter of bore 36. A biasing means, such as o-ring spring 64, urges each jaw 60 into bore 36 such that jaws 60 can engage groove 48. As best seen in FIGS. 1 and 2, chuck 56 is located and attached to the inner part of an actuator, such as for example piston 68. Piston 68 and is slideably movable with respect to the longitudinal axis of bore 36. Specifically, in this embodiment of the present invention, piston 68 includes a pneumatic seal, such as o-ring 72, which sealingly engages an inner lateral surface 75 of a multifunctional and removable piston housing 76. A fluid under pressure, such as air (which for CDs and DVDs molding is preferable as being cleaner than oil) or oil, can be introduced into piston housing 76 above o-ring 72, via a conduit 80, to bias piston 68 away from mold plate 28, thus moving jaws 60 radially inward, as described below. Similarly air, or another pressurized fluid, can be introduced into piston housing 76 below o-ring 72, via a conduit 84, to bias piston 68 toward mold plate 28, thus moving jaws 60 radially outward, as described below.

As seen in FIG. 2, the jaws 60a, 60b and 60c are mounted to the piston 68 by a retaining ring 49 which is secured to the piston 68 by screws 51. The jaws 60a, 60b and 60c are therefore radially slidable yet axially immovable relative to the piston 68.

As also shown in FIGS. 1 and 2, each jaw 60 includes an upper inclined retaining and guiding surface 88 which abuts a complementary inclined surface comprising cam 92. Cam 92 is part of the piston housing 76 such that, when piston 68 is biased towards mold plate 28, inclined surface 88 on each jaw 60 rides up on cam 92 on housing 76. A suitable spring means such as for example o-ring spring 64 is used to maintain permanent contact between the cams and the jaws and thus each jaw 60 retracts (moves radially outward) from bore 36 as shown in FIG. 1. Conversely, when piston 68 is biased away from mold plate 28, inclined surface 88 on each jaw 60 jaw rides down on cam surface 92 and thus each jaw 60 advances (moves radially inward) into bore 36 to engage groove 48, and thus retain stamper plate 24.

While it is presently preferred that chuck 56 include three equi-spaced jaws 60, it will be apparent to those of skill in the art that other configurations of chuck 56 can also be employed. For example, in some contemplated circumstances, such as when retaining a mold element that is subject to only light mechanical forces during molding operations, a single jaw can be employed. In other contemplated circumstances, such as when the retained mold element is subject to relatively large mechanical forces during molding operations, more than three jaws 60 can be employed for additional mechanical strength. It is also contemplated that biasing means other than o-ring 64, such as coil springs, can be employed to urge jaws 60 into bore 36 when increased bias forces are desirable.

In molding operations, it is sometimes desirable to have a workpiece ejection mechanism to facilitate removal of the molded article from within the mold. For example, in mold operations of plastic information carriers such as CDs and/or DVDs, it may be desirable to have an ejection mechanism to facilitate the separation of the molded CD or DVD from the cavity mold comprising the stamper plate at the completion of the molding operation. In the embodiment of the present invention shown in FIGS. 1, 2 and 3, a mechanical workpiece ejection mechanism located in the mold plate is provided in the form of workpiece ejector 100.

Workpiece ejector 100 includes a piston 104 which rides within a lower housing 106 and which includes a sealing means, such as o-ring 108, which sealingly engages the inner surface of housing 76. Workpiece ejector 100 also includes an ejector rod 112 which extends toward stamper 24 from piston 104 through bore 36. Ejector rod 112 has a cross-sectional shape which is complementary to the interior cross-section of spigot 32 such that spigot 32 can be inserted between the inner wall of bore 36 and the outer surface of ejector rod 112 as shown in FIG. 2.

Within lower housing 106, piston 104 can be urged toward or away from stamper 24 via pneumatic pressure. Specifically, a suitable pneumatic fluid, such as air, can be introduced into lower housing 106, above piston 104, through a conduit 116 to urge piston 104 away from stamper 24. Similarly, a suitable pneumatic fluid such as air can be introduced into lower housing 106, below piston 104, through a conduit 120 to urge piston 104 toward stamper 24. A seal, such as o-ring 124, isolates pneumatic fluid beneath piston 68 in housing 76 from pneumatic fluid above piston 104 in lower housing 106.

As will be apparent to those of skill in the art, pneumatic fluid is supplied through conduit 120 at the end of the mold cycle and piston 104 is urged toward stamper 24, raising ejector rod 112. Raised ejector rod 112 abuts the molded article formed on stamper 24 and separates the molded article therefrom allowing the article to be extracted from the mold. Pneumatic fluid is then supplied through conduit 116 to retract ejector rod 112 for the start of the next mold cycle.

When it is desired to insert or change stamper 24, pneumatic fluid is supplied through conduit 84 to urge piston 68 toward stamper plate 24. Inclined surfaces 88 of jaws 60 ride on cams 92 of housing 76 retracting jaws 60 from bore 36. In the event that a stamper change is being performed, jaws 60 are retracted from groove 48 in spigot 32 and stamper 24 can then be lifted from mold plate 28 by any suitable means, as will occur to those of skill in the art.

Once the mold is without a stamper 24, either after an existing stamper 24 has been removed or in the event that no stamper 24 was present, spigot 32 of the stamper 24 which is to be retained is inserted into bore 36 until groove 48 is located adjacent chuck 56. Pneumatic fluid is supplied through conduit 80 urging piston 68 away from stamper 24 and allowing inclined surfaces 88 of jaws 60 to ride down cams 92 of housing 76 and jaws 60 to extend into bore 36 and groove 48, thus retaining spigot 32 and stamper 24 in place in the mold. In a preferred aspect of the invention, the supply of pneumatic fluid through conduit 80 is maintained whenever a stamper is in place as this maintains pressure on piston 68 and results in spigot 32 being exposed to a tensioning force which assists in keeping the stamper in position.

One of the contemplated advantages of the embodiment of the present invention shown in FIGS. 1, 2 and 3 is its use with automated mechanisms for loading and unloading stampers. In particular, and as shown in FIG. 2, a conventional robotic arm 140 can be employed to load and unload stampers. Robotic arm 140 can engage a stamper 24 with a vacuum means, or other suitable means as will occur to those of skill in the art and, to load stamper 24, robotic arm 140 need only align spigot 32 with bore 36 and insert spigot 32 therein. Similarly, to remove a stamper 24, robotic arm 140 need only engage stamper 24 and withdraw spigot 32 from bore 36. Of course, in both circumstances pneumatic fluid will be supplied appropriately to engage and/or disengage jaws 60 as appropriate.

Figure 4:
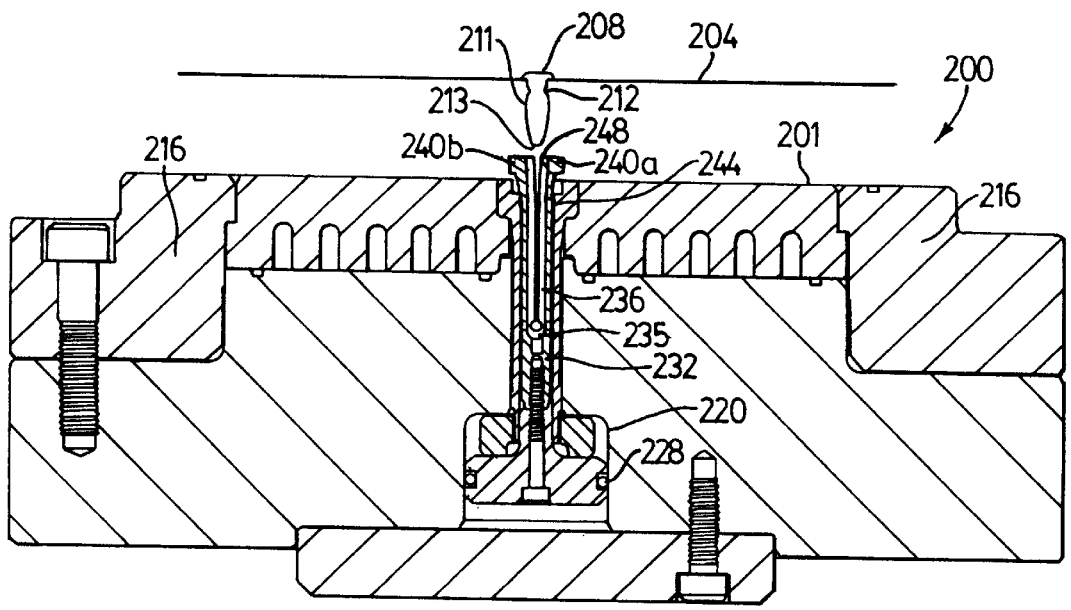
FIG. 4 shows a cross section view of another mold element retaining apparatus in accordance with an embodiment of the present invention.

A second embodiment of the present invention is indicated generally at 200 in FIG. 4 where a novel spigot means employs a different retention mechanism that is actuated in a manner similar to the one shown in FIGS. 1–2. With conventional spigot designs, the spigot is an elongated tube which is quite heavy and has a length which requires opening of the mold during the stamper plate change operation much more than is normally needed to only eject the molded disc after each injection cycle. Also, storing a stamper plate with a conventional spigot in a stamper replacement magazine close to the injection molding machine becomes more problematic due to the length of the spigot. Further, the robotics arm needed to handle the stamper plate and the spigot has to be also very robust and thus heavier and slower than the robotics arm used to handle the ejected only CDs and DVDs.

To address these issues, in the second embodiment of the present invention, a mold element to be retained, such as stamper plate 204, is attached to a novel spigot means 208. Spigot means 208 is generally shorter, lighter and easier to manufacture and attach to the stamper plate then conventional spigots. Spigot means 208 includes a neck portion 212 which is adjacent stamper 204, a body portion 211 and a lower tip portion 213. Lower tip portion 213 can extend sufficiently to allow the retention mechanism to engage spigot means 208 before it goes into the mold plate, spigot means 208 being further moved for only a very short distance to be secured to the mold. By using spigot means 208, loading or removal of the stamper plate does not require overstroking of the mold opening sequence beyond the usual amount required to eject the molded article using a robotics arm.

A half mold plate 216 includes within it a piston housing 220 in which a slidable piston 224 is located. Piston 224 includes a sealing member, such as o-ring 228, which separates the interior of piston housing 220 into a pneumatic chamber above piston 224 and a pneumatic chamber below piston 224. Piston 224 further includes an upstanding cylindrical connecting member 232 that engages a collet means 236 that is used to engage and disengage spigot means 208.

Collet means 236 comprises at least two split elongated-parts or jaws that are used to engage spigot means 208 when they are forced against each other. In a preferred embodiment of FIG. 4, three elongate jaws 240a, 240b and 240c (not shown) which have spring-like characteristics and are joined at bottom portion 235 adjacent to the point at which collet means 236 connects to actuating member 232. Each jaw 240 include a profiled portion comprising a collar 248 which is substantially complementary in shape to neck portion 212 on spigot 208. Each jaw 240 further includes outer sides which are tapered from a maximum exterior dimension adjacent collar 248 to a minimum exterior dimension distal collar 248.

Figure 5:
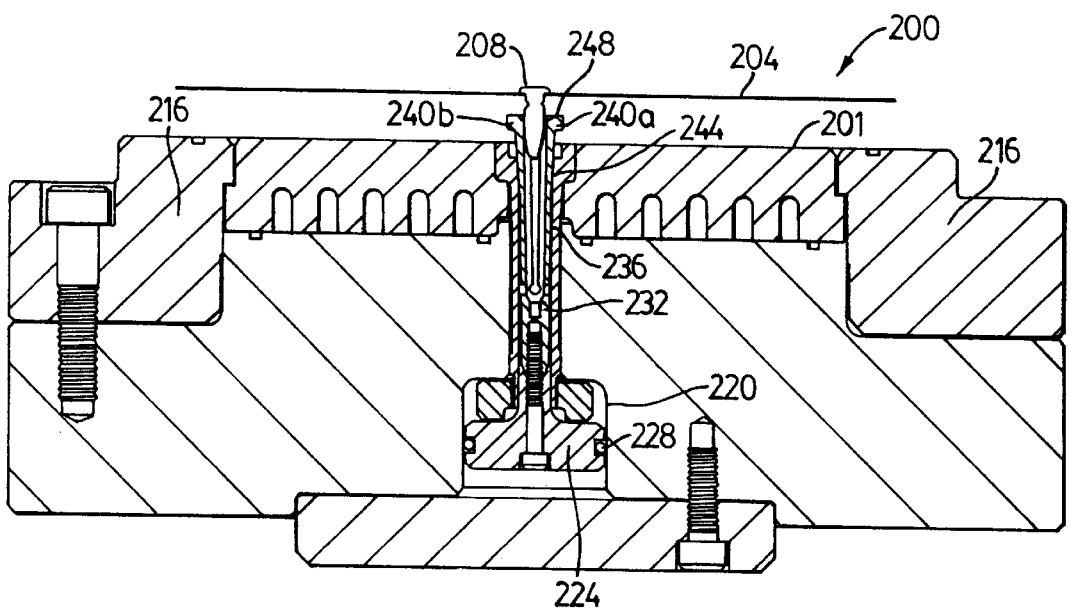
FIG. 5 shows a cross section view of the mold element retaining apparatus of FIG. 4 wherein a mold element is being inserted into a retaining means of the apparatus.
Figure 6:
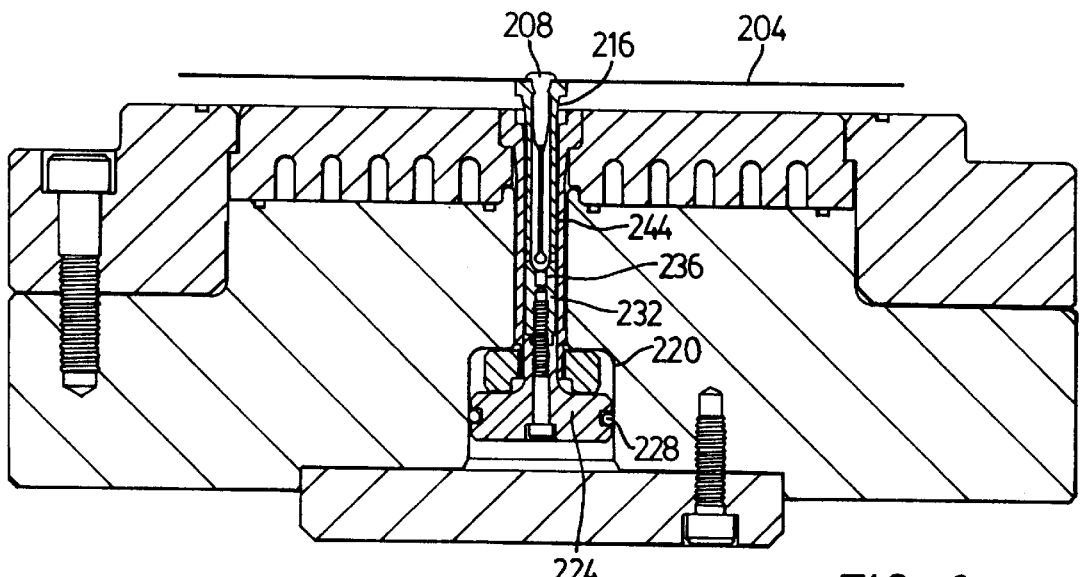
FIG. 6 shows a cross section view of the mold element retaining apparatus of FIG. 4 wherein a mold element has been inserted into the retaining means.

A fluid conduit, not shown, allows any suitable pneumatic fluid, such as air, to be introduced below piston 224 in housing 220 urging piston 224 upward, toward bore 244, thus moving actuating member 232 and collet means 236 within bore 244 toward the cavity mold portion 201 and stamper plate 204. This results in the slight opening the portions of jaws 240 extending from mold plate 216, as shown in FIG. 4. In this position, the spring-like characteristics and resilience of jaws 240 allows spigot 212 to be inserted between jaws 240 as shown in FIG. 5, which then engage the body of spigot 208. As shown in FIG. 6, this brings neck portion 212 of the spigot into tight abutment with collar 248.

Figure 7:
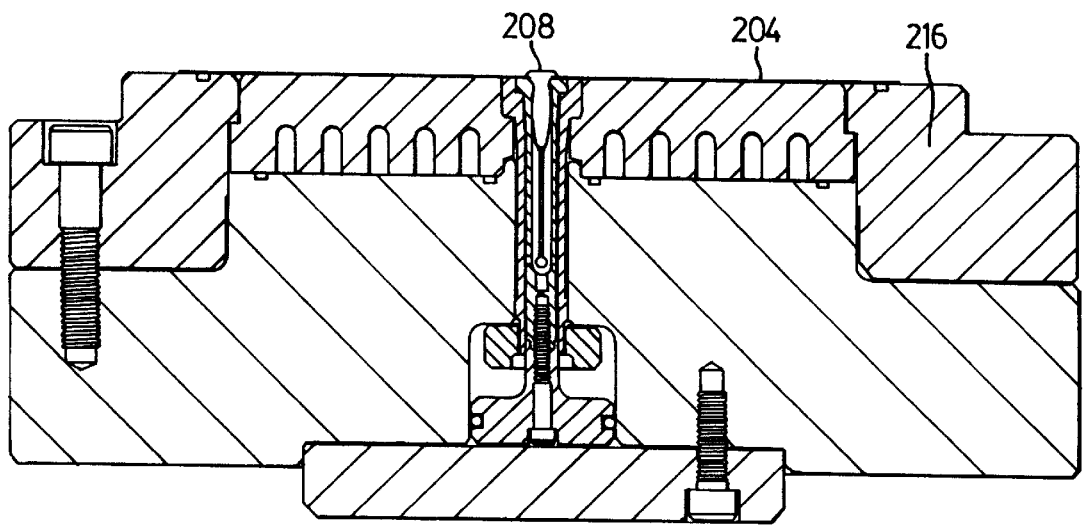
FIG. 7 shows a cross section view of the mold element retaining apparatus of FIG. 4 wherein the retaining means has been retracted and the mold element is retained.
Figure 8:
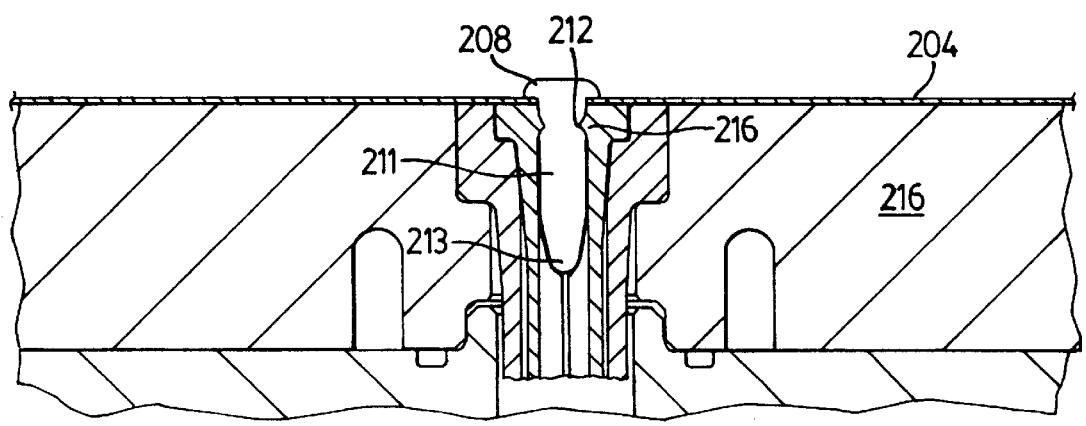
FIG. 8 shows an enlarged cross section view of the mold element retained in the mold element retaining apparatus of FIG. 4.

Once collar 248 has engaged neck 212, a suitable pneumatic fluid, such as air, is introduced via a fluid conduit (not shown) above piston 224 in piston housing 220, urging piston 224 downward, away from bore 244, thus moving actuating member 232 within bore 244 away from the cavity mold surface 201 together with the stamper plate 204. This results in the larger exterior diameter portions of jaws 240 being urged together as they abut the interior of bore 244 to retain spigot 212 securely in collet means 236 as shown in FIG. 7 and in more detail in FIG. 8. As was the case with the previously described embodiment, in a preferred aspect the supply of pneumatic fluid to piston 224 to urge it downward, away from bore 244, is maintained whenever a stamper is in place. In this manner, spigot 212 is exposed to a tensioning force which assists in maintaining it in position.

One of the perceived advantages of this embodiment of the present invention is that spigot 208 can be relatively short, as is the stroke required to extend and retract collet means 236, thus avoiding the necessity of opening the mold to a larger extent. Further, the mass of collet means 236, actuator 232 and piston 224 is relatively small and, in combination with the short stroke, allows relatively quick cycling operation of the mold element retaining apparatus.

Figure 9:
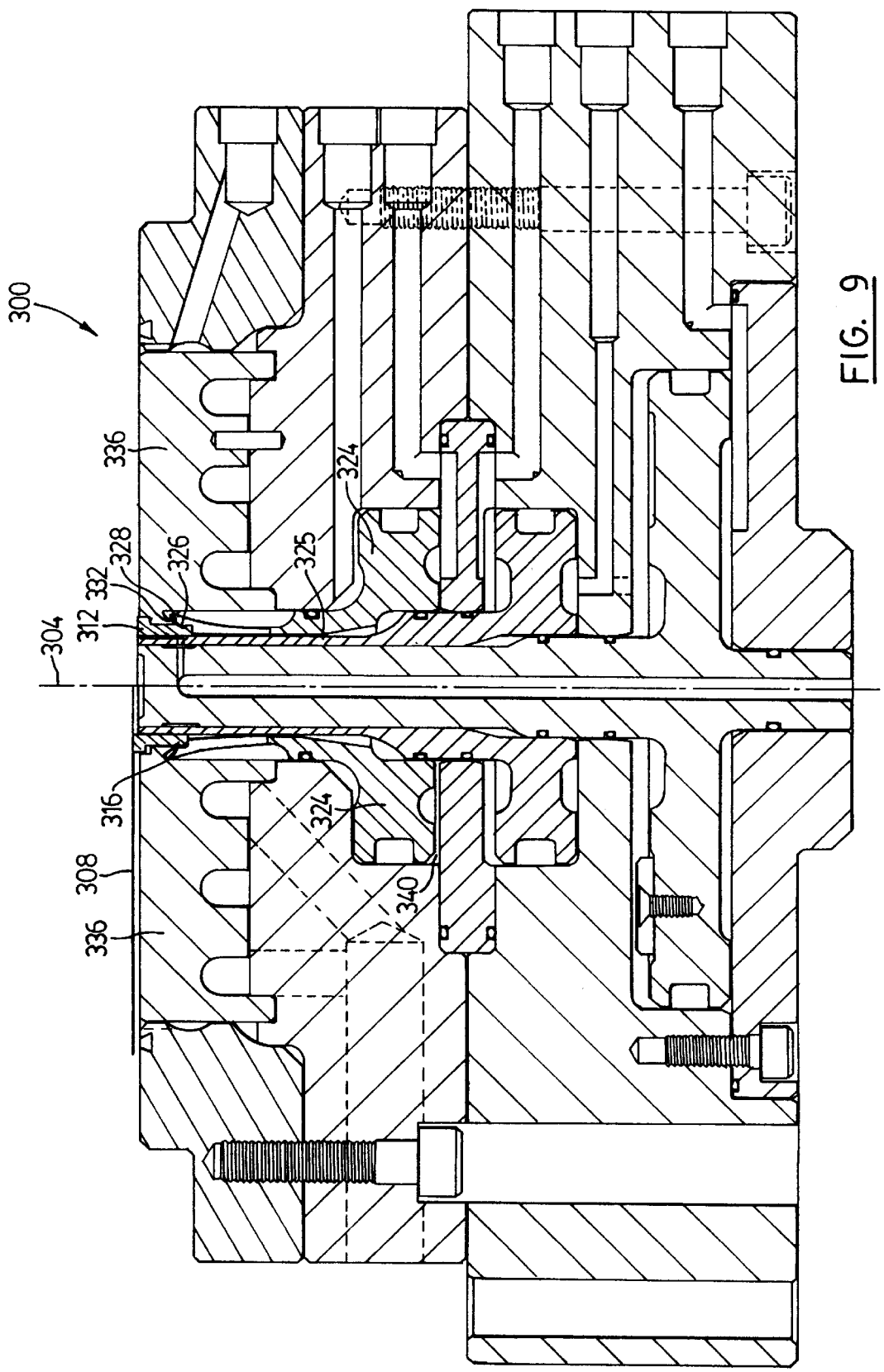
FIG. 9 shows a cross section view of another mold element retaining apparatus in accordance with an embodiment of the present invention.
Figure 10:
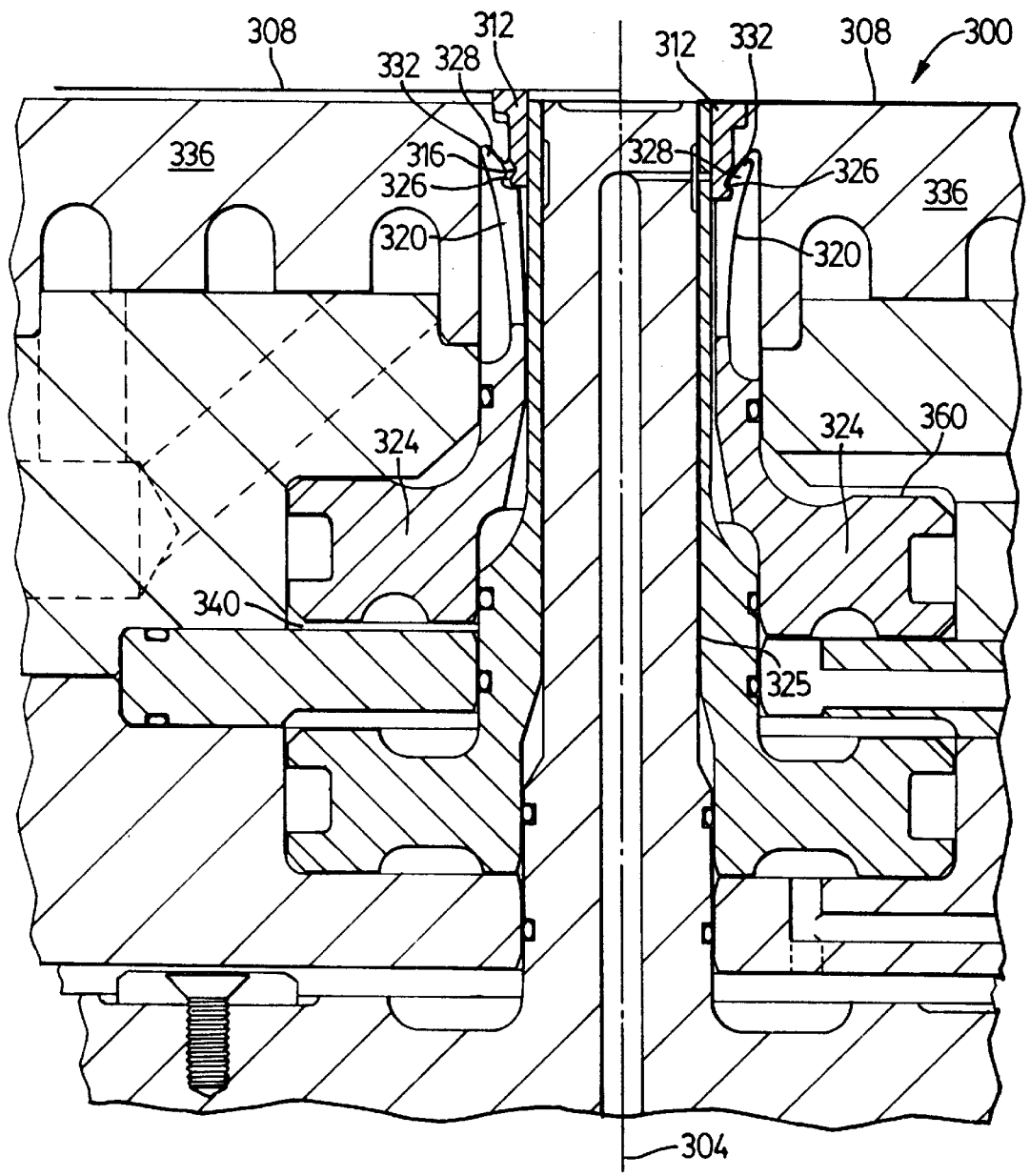
FIG. 10 shows an enlarged view showing the center portion of FIG. 10 in more detail.

Another embodiment of the present invention is indicated generally at 300 in FIGS. 9 and 10. In these Figures, apparatus 300 is shown in the loading (up) position on the left side of line 304 and in the loaded (down) position on the right side of line 304. As shown, a stamper 308 has a spigot 312 attached which is much shorter than those of the embodiments described above. Spigot 312 includes a retaining means, in this example groove 316, which is engaged by jaws 320. In a preferred embodiment, three jaws 320 are provided, each jaw 320 being an elongate member which extends upwardly from a piston 324. In the embodiment illustrated, piston 324 is annular and encircles a central bore 325. Each jaw 320 includes a cam surface 328 at its uppermost end which rides on an inclined surface 332 of mold plate 336 and further includes a tooth 326 to engage groove 316. The dimensions and material of jaws 320 are selected to provide a degree of spring-like resilience to jaws 320 and thus jaws 320 are biased radially inwardly with respect to central bore 325.

When a supply of a pneumatic fluid, such as air, is provided to the volume 340 below piston 324, piston 324 is moved upwardly, moving jaws 320 upwardly also. As each jaw 320 moves upwardly, its cam surface 328 rides on its respective inclined surface 332 which urges the upper portion of jaw 320 away from spigot 312 and disengages tooth 326 from groove 316 (if a stamper is present) as shown on the left side of line 304. In this position, a stamper can be removed and/or loaded into apparatus 300.

When a supply of pneumatic fluid, such as air, is provided to the volume 360 above piston 324, piston 324 is moved downwardly and cam surface 328 of each jaw 320 rides down on its respective inclined surface 332. Due to the above-mentioned biasing, the upper ends of jaws 320 move radially inwardly, bringing teeth 326 into engagement with groove 316 if a stamper is present. This is illustrated in the Figures on the right side of line 304. As before, in a preferred aspect the supply of pneumatic fluid to volume 360 is maintained when a stamper is in place so that jaws 320 are subject to a tensioning force which acts on stamper 308 through spigot 312 and which assists in maintaining stamper 308 in place.

As will be apparent to those of skill in the art, this embodiment is believed to provide advantages in that the length of spigot 312 is much less than conventional spigots, thus reducing the degree to which the mold must be opened to remove or load a stamper, compared to conventional spigots.

Figure 11:
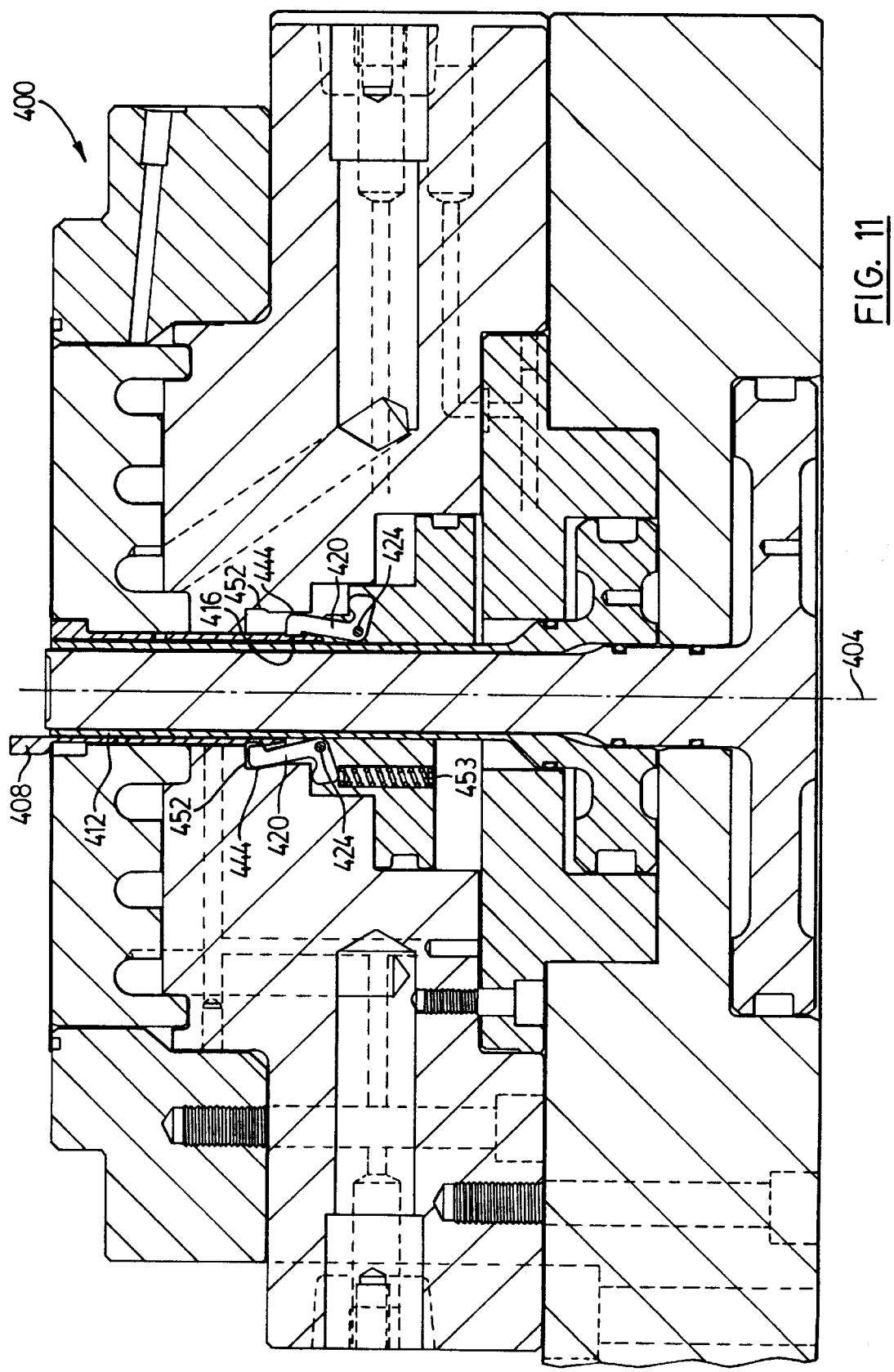
FIG. 11 shows a cross section view of another mold element retaining apparatus in accordance with an embodiment of the present invention.
Figure 12:
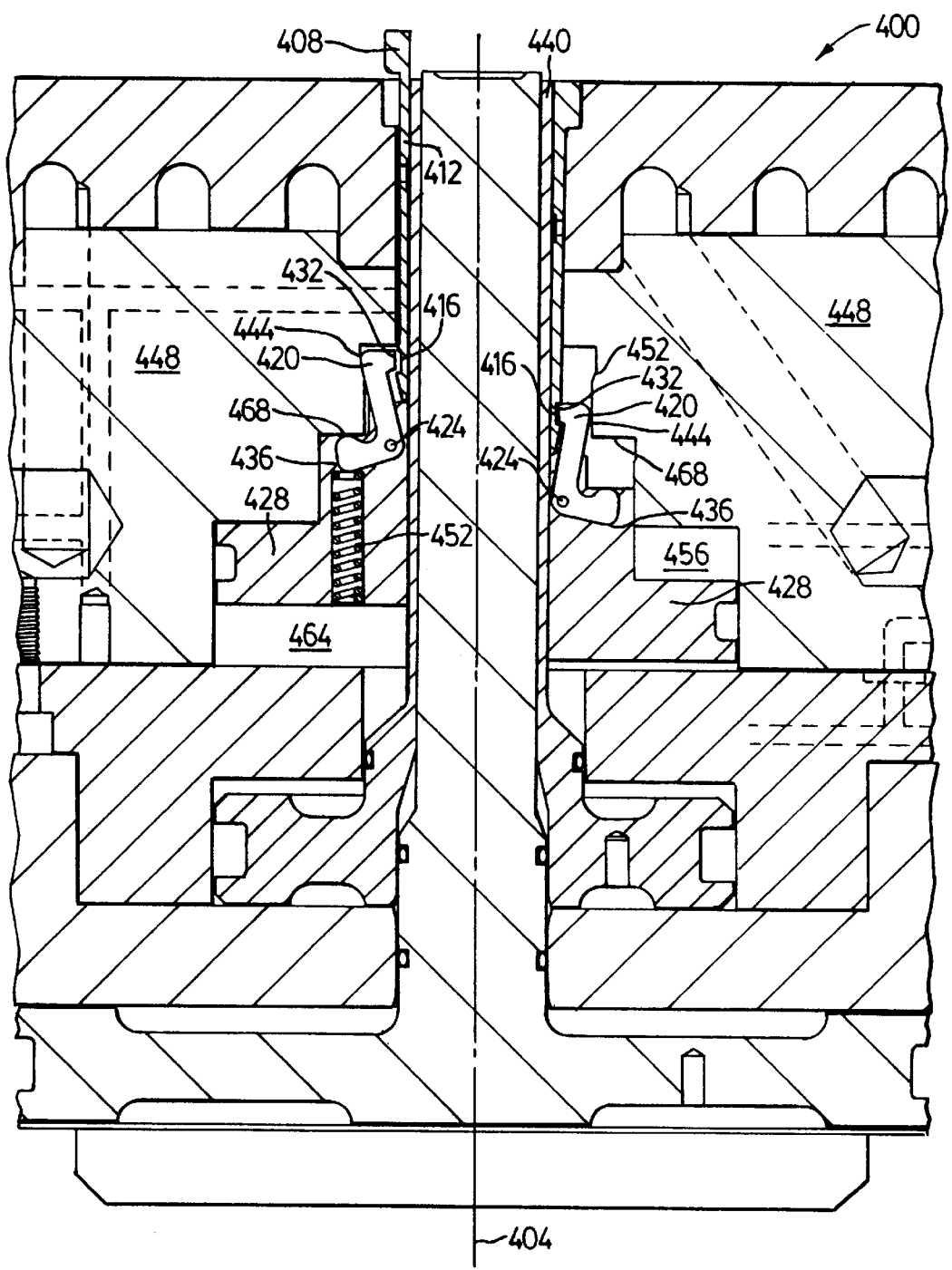
FIG. 12 shows an enlarged view showing the center portion of FIG. 11 in more detail.

Another embodiment of the present invention is indicated generally at 400 in FIGS. 11 and 12. In these Figures, apparatus 400 is shown in the loading (up) position on the left side of line 404 and in the loaded (down) position on the right side of line 404. Spigot 408 (which is shown unattached to a stamper) includes an elongate body 412 and a retaining means, in this example groove 416. A set of pivoting jaws 420 are provided to engage groove 416. In a preferred embodiment of the present invention, three equi-spaced jaws 420 are provided.

Each jaw 420 is mounted by a pivot pin 424 to a piston 428 and each jaw 420 includes a retainer engagement end 432 and a mold plate abutment end 436. In the embodiment illustrated, piston 428 is annular and encircles a central bore 440. Each jaw 420 includes a cam surface 444 adjacent the retainer engagement end 432 and the mold plate 448 includes an inclined surface 452 on which cam surface 444 rides. A biasing means, such as a helical spring 453 is also provided to bias jaws 420 to the position of the jaw 420 shown on the right hand side of line 404.

When a supply of a pneumatic fluid, such as air, is provided to the volume 456 above piston 428, piston 428 is moved downwardly, moving jaws 420 downwardly also. As each jaw 420 moves downwardly, its cam surface 444 rides on its respective inclined surface 452 which urges the retainer engagement end 432 of jaw 420 toward spigot 408 and into engagement with groove 416 (if a stamper is present) as shown on the right side of line 404. In this position, a stamper is maintained in place by apparatus 400. As before, in a preferred aspect the supply of pneumatic fluid to volume 456 is maintained when a stamper is in place so that jaws 420 are subject to a tensioning force which acts on the stamper through spigot 408 and which assists in maintaining the stamper in place.

When a supply of pneumatic fluid, such as air, is provided to the volume 464 below piston 428, piston 428 is moved upwardly and cam surface 444 of each jaw 420 rides up on its respective inclined surface 452. As mold plate engagement portion 436 abuts a portion 468 of mold plate 448, jaws 420 are pivoted about pin 424 and retainer engagement portion 432 is moved away from groove 416 allowing spigot 408 to be loaded into or removed from apparatus 400. This is illustrated in the Figures on the left side of line 404.

The above-described embodiments of the invention are intended to be examples of the present invention and alterations and modifications may be effected thereto, by those of skill in the art, without departing from the scope of the invention which is defined solely by the claims appended hereto.

I claim:

1. A mold element retaining system for securing a mold element to a mold plate, said mold element retaining system comprising:

a retaining spigot connectable to a mold element to be retained;

an axially moveable retaining means having a first configuration for engaging said retaining spigot and a second configuration for releasing said retaining spigot;

an actuator for moving said retaining means between said first and second configurations;

tensioning means for applying an axial force to said retaining means in said first configuration urging said mold element toward said mold plate wherein, said actuator acts as said tensioning means, said retaining spigot includes a grooves, and, said retaining means further comprises a chuck having at least one jaw to engage said groove in said first configuration and to disengage said groove in said second configuration.

2. A mold element retaining system according to claim 1 wherein said chuck includes at least three jaws which, in said first configuration, engage said groove at equi-spaced locations.

3. A mold element retaining system according to claim 1 wherein said actuator comprises a pneumatically operable piston.

4. A mold element retaining system according to claim 3 wherein said at least one jaw is mounted to and radially slidable relative to said pneumatically operable piston and axially immovable relative thereto.

5. A mold element retaining system according to claim 2 wherein:

the actuator comprises a pneumatically operatable piston;

said at least three jaws are mounted to said piston, are radially slidable relative to said piston and are axially immovable relative to said piston, said piston acts as said tensioning means.

6. A mold element retaining system as claimed in claim 5 wherein:

said at least three jaws move radially inwardly from said second configuration to said first configuration;

biasing means are provided for urging said at least three jaws toward said first configuration; and, cooperating cam surfaces extend from said mold plate and said at least three jaws to move said at least three jaws radially outwardly in response to axial movement of said pneumatically operable piston toward said mold element.

7. A mold element retaining system as claimed in claim 6 wherein said biasing means is an O-ring spring encircling said at least three jaws.

8. A mold element retaining system for securing a mold element to a mold plate, said mold element retaining system comprising:

a retaining spigot connectable to a mold element to be retained;

an axially moveable retaining means having a first configuration for engaging said retaining spigot and a second configuration for releasing said retaining spigot, an actuator for moving said retaining means between said first and second configurations;

tensioning means for applying an axial force to said retaining means in said first configuration urging said mold element toward said mold plate wherein, said actuator acts as said tensioning means, said retaining spigot includes a neck, and, said retaining means comprises at least two elongate jaws each having a collar member adjacent a first end of said jaw to engage said neck and each jaw being resiliently connected to the other jaw at a second end, said collars being biased against said neck when said retaining means is in said first configuration.

9. A mold element retaining system according to claim 8 wherein each said jaw includes a tapered outer surface which abuts against the interior surface of a bore extending into said mold plate when said retaining means is in said first configuration, said the tapered outer surface biasing said collars against said neck.

10. A mold element retaining system according to claim 9 wherein said actuator comprises a pneumatically operable piston.

11. A mold element retaining system according to claim 10 wherein:

said at least two elongate jaws are connected to said pneumatically operable piston for axial movement by said pneumatically operable piston along said bore;

said elongate jaws move into said mold plate in moving between said second configuration and said first configuration.

12. A mold element retaining system for securing a mold element to a mold plate, said mold element retaining system comprising:

a retaining spigot connectable to a mold element to be retained;

an axially moveable retaining means having a first configuration for engaging said retaining spigot and a second configuration for releasing said retaining spigot;

an actuator for moving said retaining means between said first and second configurations;

tensioning means for applying an axial force to said retaining means in said first configuration urging said mold element toward said mold plate wherein, said actuator acts as said tensioning means, said retaining spigot includes a neck, and, said retaining means comprises at least two elongate jaws each having a tooth extending radially inwardly from a first end thereof to engage said groove in said spigot in said first configuration, each jaw being resiliently connected to each other at a second end, each said tooth being biased toward said groove in said first configuration.

13. A mold element retaining system for securing a mold element to a mold plate, said mold element retaining system comprising:

a retaining spigot connectable to a mold element to be retained an axially moveable retaining means having a first configuration for engaging said retaining spigot and a second configuration for releasing said retaining spigot;

an actuator for moving said retaining means between said first and second configurations; and, tensioning means for applying an axial force to said retaining means in said first configuration urging said mold element toward said mold plate; wherein, said retaining spigot includes a neck and said retaining means comprises at least two elongate jaws each having a tooth extending generally radially inwardly from a first end thereof to engage a groove in said spigot in said first configuration, each jaw being resiliently connected to each other at a second end, each said tooth being biased toward said groove in said first configuration, each said jaw is axially slidable along a bore extending into said mold plate and each said jaw has a cam surface at said first end; and, said bore has an inclined surface extending radially into said bore on which said cam surface rides to urge each said first end of said jaw radially outwardly to disengage each said tooth from said groove as said jaw is axially slid toward said mold element.

14. A mold element retaining system according to claim 13 wherein:

said actuator is a pneumatically operable piston;

each said jaw is connected to said piston for axial movement;

each said jaw moves toward said mold plate in going from said second configuration to said first configuration; and said pneumatically operable piston further acts as said tensioning means.

15. A mold element retaining system for securing a mold element to a mold plate, said mold element retaining system comprising:

a retaining spigot connectable to a mold element to be retained;

an axially moveable retaining means having a first configuration for engaging said retaining spigot and a second configuration for releasing said retaining spigot;

an actuator for moving said retaining means between said first and second configurations; and, tensioning means for applying an axial force to said retaining means in said first configuration urging said mold element toward said mold plate; wherein, said spigot includes a groove, said retaining means includes at least one pivoting jaw to engage said groove in said first configuration and to disengage said groove in said second configuration; and, each said jaw has a retainer engagement end and a mold plate abutment end.

16. A mold element retaining system according to claim 15 wherein:

said actuator comprises a pneumatically operable piston;

each said jaw is pivotally mounted to said piston;

said mold plate has a bore extending into it for receiving said spigot;

said piston is annular, coaxial with and axially slidable relative to said bore;

each said jaw includes a cam surface adjacent said retainer engagement end which rides on an inclined surface of said mold plate adjacent said bore to urge each said jaw into engagement with said groove as said piston moves away from said mold plate;

said mold plate abutment end abuts a portion of said mold plate to pivot each said jaw out of engagement with said groove as said piston is moved toward said mold plate.

17. A mold element retaining system according to claim 16 wherein:

biasing means are provided to urge said jaw toward said first configuration.

18. A mold element retaining system as claimed in claim 17 wherein said biasing means acts between each said mold plate abutment end and said piston.

19. A mold element retaining system as claimed in claim 18 having at least three of said jaws.

\* \* \* \* \*

UNITED STATES PATENT AND TRADEMARK OFFICE
CERTIFICATE OF CORRECTION

PATENT NO.    : 6,325,614 B1
DATED         : December 4, 2001
INVENTOR(S)   : DiSimone It is certified that error appears in the above-identified patent and that said Letters Patent is hereby corrected as shown below:

<u>Title page,</u>
Item [73], Assignee, should read, -- Assignee: Huskey Injection Molding Systems Ltd., (Bolton, Ontario, CA) --.

Signed and Sealed this

Eighteenth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,325,614 B1
DATED : December 4, 2001
INVENTOR(S) : DiSimone

It is certified that error appears in the above-identified patent and that said Letters Patent is hereby corrected as shown below:

<u>Title page</u>,
Item [73], Assignee, should read -- Husky Injection Molding Systems Ltd., (Bolton, Ontario, CA) --.

This certificate supersedes Certificate of Correction issued October 18, 2005.

Signed and Sealed this

Ninth Day of May, 2006

JON W. DUDAS
*Director of the United States Patent and Trademark Office*